(12) United States Patent
Stark et al.

(10) Patent No.: US 7,211,236 B2
(45) Date of Patent: May 1, 2007

(54) FLAME MADE METAL OXIDES

(75) Inventors: Wendelin J. Stark, Winterthur (CH); Lutz Mädler, Zurich (CH); Sotiris E. Pratsinis, Zürich (CH)

(73) Assignee: Eidgenossische Technische Hochschule Zurich, Zurich (CH)

( * ) Notice: Subject to any disclaimer, the term of this patent is extended or adjusted under 35 U.S.C. 154(b) by 347 days.

(21) Appl. No.: 10/602,305

(22) Filed: Jun. 24, 2003

(65) Prior Publication Data
US 2004/0126298 A1 Jul. 1, 2004

Related U.S. Application Data

(60) Provisional application No. 60/394,965, filed on Jul. 9, 2002.

(30) Foreign Application Priority Data
Jul. 3, 2002 (EP) .................................. 02014100

(51) Int. Cl.
*C01F 1/00* (2006.01)
*C01F 17/00* (2006.01)
*C01G 1/00* (2006.01)

(52) U.S. Cl. .............................. 423/592.1; 423/593.1; 423/594.12; 423/594.15; 423/594.16; 423/635; 423/636; 423/641; 423/263

(58) Field of Classification Search ............. 423/592.1, 423/593.1, 594.12, 635, 636, 641, 263, 594.15, 423/594.16
See application file for complete search history.

(56) References Cited

U.S. PATENT DOCUMENTS

2004/0050207 A1\* 3/2004 Wooldridge et al. .......... 75/362
2005/0227864 A1\* 10/2005 Sutorik et al. .............. 502/304

FOREIGN PATENT DOCUMENTS

| EP | 0803471 A1 | 10/1997 |
| EP | 1142830 A1 | 10/2001 |
| WO | WO 01/36332 A1 | 5/2001 |

OTHER PUBLICATIONS

Aruna et al. "Combustion synthesis and properties of nanostructured ceria-zirconia solid solutions" Nanostructured Materials, (1998), vol. 10, No. 6, pp. 955-964.\*
Madler et al. "Controlled synthesis of nanostructured particles by flame spray pyrolysis" Journal of Aerosol Science, (Feb. 2002), vol. 33, pp. 369-389.\*
L. Madler et al. (2002) "Flame-made ceria nanoparticles", J. Mater. Res., vol. 17, No. 6, pp. 1356-1362.
A.R. Di Giampaolo et al., "ZrO2 coatings on stainless steel by aerosol thermal spraying", Advances In Technology Materials And Materials Processing Journal (1998), 1(1), 90-100 (abstract).
L. Madler et al. (2002) "Bismuth Oxide Nanoparticles by Flame Spray Pyrolysis", J. Am. Ceram. Soc., vol. 85, No. 7, pp. 1713-1718.

\* cited by examiner

*Primary Examiner*—Timothy C. Vanoy
(74) *Attorney, Agent, or Firm*—Cooper & Dunham LLP

(57) ABSTRACT

Described is a method for the production of metal oxides by flame spray pyrolysis, in particular mixed metal oxides such as ceria/zirconia, and metal oxides obtainable by said method. Due to high enthalpy solvents with a high carboxylic acid content said metal oxides have improved properties. For example ceria/zirconia has excellent oxygen storage capacity at high zirconium levels up to more than 80% of whole metal content.

33 Claims, 12 Drawing Sheets

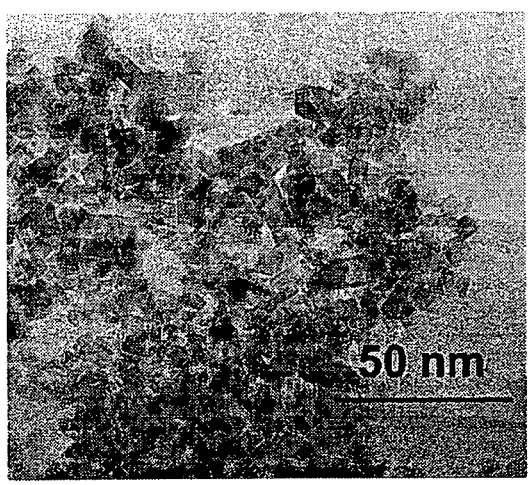 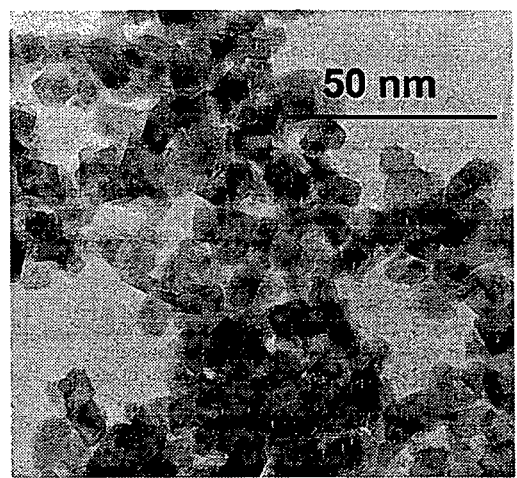
Figure 1A                    Figure 1B

FLAME MADE METAL OXIDES

CROSS REFERENCE TO RELATED APPLICATIONS

This application claims the priority of European application No. 02 014 100.8, filed Jul. 3, 2002 and of U.S. patent application Ser. No. 60/394,965, filed on Jul. 9, 2002, the disclosures of which are incorporated herein by reference in their entirety.

TECHNICAL FIELD

The present invention concerns a specific flame method and metal oxides with specific features that are obtainable by said method, in particular cerium and zirconium oxides with excellent thermal stability and high oxygen exchange capacities.

BACKGROUND ART

Metal oxides, in particular mixed metal oxides have a broad range of applications such as e.g. ceramics, polymer additives, fillers, pigments, reactive surfaces, catalysts, storage materials, polishing additives, membranes, fuel cells etc. Among the most important metal oxides are cerium oxides and in particular cerium-zirconium mixed oxides, below referred to as ceria/zirconia. Ceria/zirconia are used in the current new generation of Three Way Catalysts (TWC) as key-component due to their high dynamic oxygen exchange capacity [Trovarelli et al. (1996), Kaspar et al. (1999)], however also as Oxidation Catalysts, Ceramics, Polishing agents and Fuel cells, amongst others.

In the treatment of noxious gases from the car exhaust, the ceria switches between its two major oxidation states Ce(III) and Ce(IV) thereby taking up or releasing electrons for the conversion of CO and residuals from the combustion process. Depending on the oxygen partial pressure, it absorbs or releases oxygen and stabilizes the air-to-fuel ratio making CO oxidation a fast and reliable process [Taylor (1984)]. It is well established, that the addition of zirconia to ceria as a solid solution greatly enhances the reducibility of the Ce(IV) [Kundakovic (1998); Balducci (1995)]. Different production methods, however, lead to a varying state of molecular mixing of ceria and zirconia. Maximum stability is found for intensively mixed powders forming a stable solid solution of zirconia in ceria. The such formed stable phase can contain more than 30 atom-% zirconium. However, most preparation method result materials unstable at higher zirconia content. The mixed oxides then forms two or more phases of different composition. This may lead to reduced overall temperature stability.

Current methods for the production of metal oxides such as ceria and ceria/zirconia are mechanical and mechanical/thermal processes, wet-phase chemistry based methods, and high temperature methods such as flame spray pyrolysis (FSP).

Mechanical and mechanical/thermal methods are energy intensive (milling!) and generally suffer from insufficient mixing at the atomic level leading to low phase stability and/or low specific surface area:

Wet-phase based methods entail huge solvent costs, produce large amounts of waste water and need calcination steps after the synthesis, making them cost intensiv. Furthermore, although e.g co-precipitation of ceria/zirconia can lead to mixed oxide powders with extremely high specific surface areas, unfortunately, the temperature stability of as-prepared oxides is characterized by a big loss of specific surface area at elevated temperature. Preparation at high temperature may produce an oxide with increased stability. This has prompted several people to attempt to prepare ceria by spray pyrolysis. Flame spray pyrolysis (FSP) is a known process and has been used for preparation of many oxides. However, in the case of ceria and in particular ceria/zirconia, the research for suitable precursors entails huge problems associated with the chemical properties of cerium and zirconium compounds. For example Yoshioka et al. (1992) used FSP for the production of ceria oxides, but they received a powder of low specific surface area. WO 01/36332 discloses a FSP method leading to an inhomogeneous product comprising ceria particles of broadly varying sizes. Aruna et al. (1998) investigated the ceria/zirconia synthesis by combusting mixtures of redox compounds and oxidizing metal precursors. This high temperature preparation yielded a high surface area product with apparently good phase mixing in as-prepared powders. However, the preparation of ceria/zirconia by solid combustion is difficult to realize at high production rates, since the process may quickly run out of control. Furthermore it is basically a batch process and the reproducibility is a general problem. Laine et al. (1999) and Laine et al. (2000) used a spray pyrolysis unit to prepare ceria/zirconia but the specific surface area of the product powder stayed low, at 10 to 15 $m^2/g$. EP 1 142 830 also discloses a FSP method for the preparation of ceria/zirconia starting from organometallic compounds in organic solvents and/or water. The procedure disclosed in EP 1 142 830 focuses on chlorine free powders produced by flame spray pyrolysis and uses precursor solutions of type MeR where R is an organic rest such as methyl, ethyl, or a corresponding alkoxy group or a nitrate anion. As solvents, water or alcohols are used.

Recently Mädler et al. (2002B) disclosed an FSP method for the production of pure ceria with high surface and homogeneous particle sizes. This solvent system, however, has now been found to be unsuitable for the production of e.g. ceria/zirconia.

Therefore there is still a need for a high temperature method for the production of metal oxides, in particular mixed metal oxides that leads to a product with increased homogeneity of the product.

DISCLOSURE OF INVENTION

Hence, it is a general object of the invention to provide a method suitable for the production of metal oxides with improved features and therefore extended applications as well as such metal oxides.

Another object of the present invention is a catalyst comprising ceria and preferably ceria/zirconia and having a monolithic structure.

Still other objects of the present invention are the use of a metal oxide of the present invention as at least part of a catalytically active system, in particular for combustion engines, or for mechanochemical polishing.

It is yet another objective of the present invention to stabilize zirconia by adding another metal oxide such as ceria or yttria for applications in fuel cells, sensors and as structural ceramic or for coatings.

Now, in order to implement these and still further objects of the invention, which will become more readily apparent as the description proceeds, the metal oxides of the present invention are manifested by the features that they are obtainable by the method of the present invention.

The method for the production of a metal oxide of the present invention, is characterized in that at least one metal oxide precursor is dissolved in a high enthalpy solvent comprising at least one carboxylic acid with a mean carbon content of >2 carbon atoms in an amount of at least 60% of total solvent to form a solution, and wherein said solution is then formed into droplets and flame oxidized.

It has been found that using a precursor mix as disclosed in the scope of the present invention in FSP allows the production of mixed oxides such as ceria/zirconia with good mixing at atomic level, excellent specific surface area (e. g. good accessibility) and high phase stability.

A precursor or precursor mix, respectively, for FSP needs to carry sufficient metal(s) into the flame, distribute said metal(s) within the flame and support a stable combustion and spray process. In the case of many metals such as for example cerium, this entails the following problems:

Few organometallic compounds are known, all organometallic compounds are rather expensive and/or contain other, often undesired elements such as halogenes.

Cheap precursors are mainly water soluble. Water, however, is a very bad basis for FSP since it is cost and equipment intensive to achieve the necessary high temperature.

The process of the present invention involves a cheap, readily available precursor mix which offers the possibility to use FSP to produce mixed metal oxides such as ceria/zirconia based mixed oxides with great homogeneity on atomic level. The precursor mix of the present invention is characterized by enabling a high concentration of dissolved metal precursors and a high combustion enthalpy. By using such precursor mix in FSP, high specific surface area metal oxides, such as ceria based materials, with excellent temperature and phase stability can be produced.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1A is a transmission electron microscope (TEM) picture of ceria/zirconia $Ce_{0.7}Zr_{0.3}O_2$ as prepared.

FIG. 1B is a transmission electron microscope (TEM) picture of ceria/zirconia $Ce_{0.7}Zr_{0.3}O_2$ after thermal treatment at 900° C. showing that such thermal treatment leads to larger particles of similar shape.

MODES FOR CARRYING OUT THE INVENTION

Figure 2:
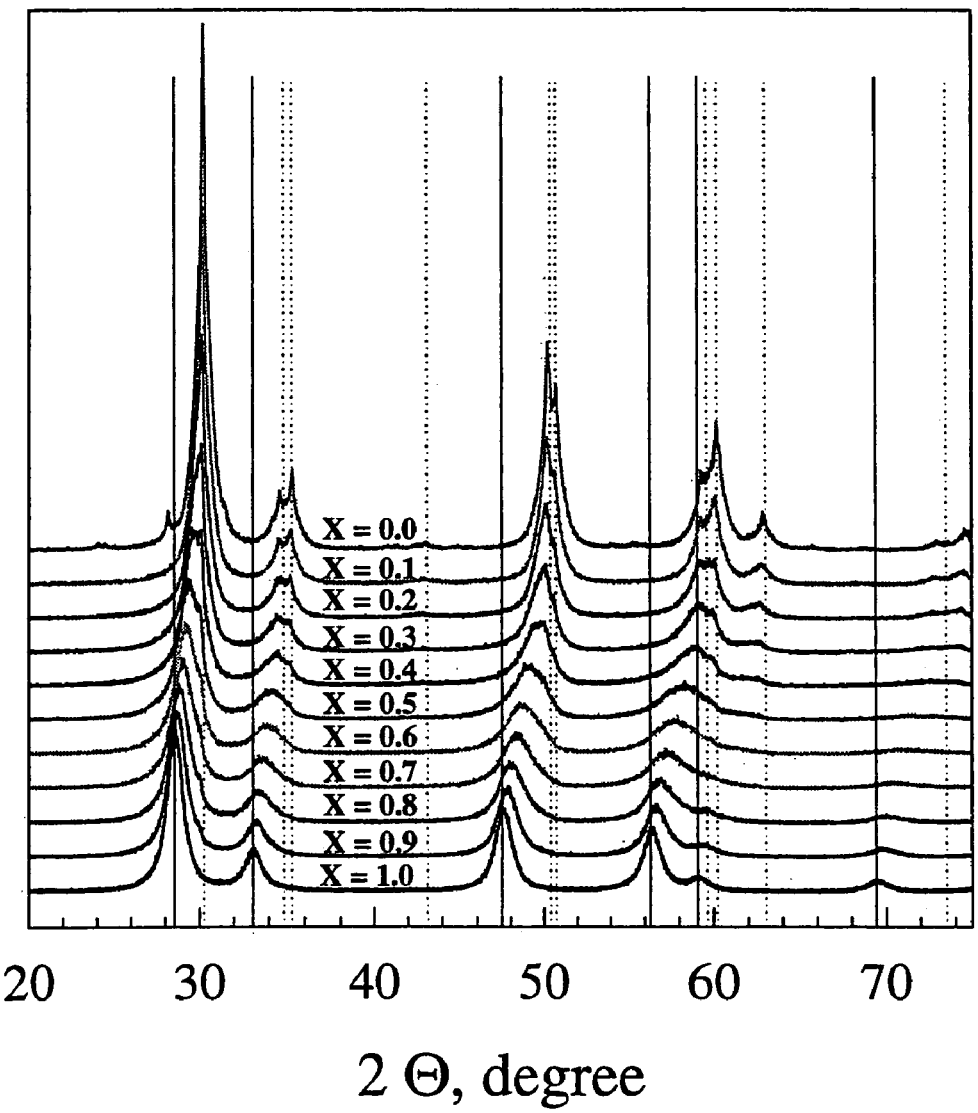
FIG. 2A shows the X-ray diffraction spectrum (XRD) of ceria/zirconia $Ce_xZr_{(1-x)}O_2$ starting from pure ceria (x=1, bottom) to pure zirconia (x=0).
FIG. 2B gives the XRD signals for the same samples as FIG. 2A but after heating to 900° C. for 2 hours in air with a heating and cooling rate of 5 K/min. While pure zirconia undergoes a phase transition, adding ceria (x=0.1) fully stabilizes the zirconia and no phase transition occurs.

The metal oxides of the present invention are obtainable by a method wherein at least one metal oxide precursor is dissolved in a high enthalpy solvent comprising at least one carboxylic acid to form a solution, and wherein said solution is then formed into droplets and flame oxidized.

In the production of pure ceria, high enthalpy content was found to be crucial to obtain a homogeneous product. At low enthalpy delivery from the precursor, insufficient energy was found to be delivered to distribute the metal within the flame. To compare the production of ceria based oxides with prior work on ceria [Mädler et al. (2002B)], pure ceria was prepared from two different precursors with similar enthalpy and the same metal delivery rate in the flame. Table 1 below lists the enthalpy of combustion, the flame height, the specific surface area of pure ceria and the XRD diameter obtained by fitting cubic ceria to the spectrum.

TABLE 1

Role of enthalpy and solvent composition in the production of ceria by flame spray pyrolysis (FSP)

|  | iso-octane solution* | lauric acid solution** |
|---|---|---|
| Heat of combustion | 23.0 kJ/g | 23.7 kJ/g |
| Flame height | 87 mm | 94 mm |
| Specific surface area of $CeO_2$ | 174 m²/g | 167 m²/g |
| $d_{XRD}$ ($CeO_2$) | 8.2 nm | 9.0 nm |
| Specific surface area of $CeO_2$, 2 h, 900° C. | 28 m²/g | 39 m²/g |

*mixture of 40% iso-octane, 50% acetic acid and 10% 2-butanol (by volume) according to Mädler et al. (2002B)
**mixture of the present invention, 50% lauric acid, 50% acetic acid (by weight)

As can be seen from the data listed in Table 1, there is some similarity between the two powders, that might be correlated with the role of enthalpy and metal concentration as important process parameters in flame spray pyrolysis of ceria and ceria-based mixed oxides, however, there must be other factors since the product prepared according to the present invention shows a reduced loss in specific surface after heating.

While in the case of pure ceria, a mixture of 40% iso-octane, 50% acetic acid and 10% 2-butanol [Mädler et al. (2002B)] could dissolve sufficient cerium acetate, however resulting in poorer surface stability upon heating compared with ceria prepared according to the present invention and in particular in insufficient storage stability of the solution (phase separation of solvents, evaporation of volatile solvents) such that scale-up is difficult or only to a limited extent possible, this process could not be extended to the synthesis of ceria/zirconia. The solubilities of the ceria and zirconia precursor were found to be too low and the thereby caused precipitation lead to an inhomogeneous and unreliable product. The effect of the presence or absence of molecular mixing was most evident from X-ray diffraction diagrams of ceria/zirconia prepared according to different methods. Spraying acetic acid/iso-octane based mixtures proposed for pure ceria led to early phase separation in the mixed oxide product. Using the precursor mixtures of the present invention, homogeneous products were obtained, following the trend of the Vegard-rule (see FIGS. 2A, 2B, 4).

The solvent used in the method of the present invention has a carboxylic acid content by weight of at least 60%, preferably at least 65%, more preferably at least 75%, especially at least 90%, and most preferably more than 90%. In a much preferred embodiment of the inventive method the solvent essentially consists of carboxylic acids (presence of usual impurities of technical solvents is acceptable), in particular of one carboxylic acid or a mixture of carboxylic acids such that the solvent has a net heat of combustion of at least 15 kJ/g, preferably at least 20 kJ/g, more preferably at least 23 kJ/g. This is achieved by an acid mixture having a mean number of carbon atoms per carboxylic group (including the C of said group) of >2 C atoms, usually at least 2.2 C atoms, preferably at least 3 C atoms, more preferably about 4 to 10 C atoms, most preferably 4 to 8 C atoms. 7 C atoms would e.g. correspond to heptanoic acid or a mixture of identical moles of acetic acid (2 C atoms) and dodecanoic acid (12 C atoms). As long as the above provisions are met, it is not very critical which acids are used.

In order to enhance the solubility of the precursors it is often favorable to use a mix of short chain and long chain carboxylic acids, whereby the short chain carboxylic acids improve the solubility of the precursors while the long chain acids ensure the high enthalpy solvent. Preferred solvent mixes comprise carboxylic acids selected from C3 to C18 monocarboxylic acids, more preferred from C5 to C16 carboxylic acids, and most preferred from C7 to C14 carboxylic acids, or mixtures of two or more of such acids, in combination with formic acid and in particular acetic acid. For ceria/zirconia mixed metal oxides a mixture of lauric acid and acetic acid, especially in a ratio of 1:1 proved to lead to a product with extraordinary properties.

If the acids become too long, on the one hand so much short chain acid has to be used to get solubility that compatibility of the acids can no longer be guaranteed, and the mixture may become unstable.

Although other acids than unsubstituted monocarboxylic acids can be used provided that they result in a suitable high enthalpy solvent, e.g. acids with polar substituents such as —OH, —NH$_2$ or —CONH$_2$ groups can be used to adjust the solvent to specific needs. In specific cases also sufficiently long chain dicarboxylic acids or polycarboxylic acids can be used. In addition, the acids may be saturated or unsaturated.

By using a solvent consisting or essentially consisting of carboxylic acids, a very good compatibility and therefore stability of the solvent mixture is obtained. As already mentioned above, using a carboxylic acid mixture has the further advantage that by using long chain acids together with short chain acids, the solubility and therewith the obtainable concentration range can be regulated/optimized. Furthermore, the use of a solvent, in particular a solvent mixture, that is stable at room temperature (no phase separation, no measurable evaporation) may also add to an enhanced storage stability of a precursor mix produced in such a solvent system. If another solvent is used that is not a carboxylic acid, such solvent usually is a high enthalpy solvent that preferably has a chain length such that it is compatible with at least one long chain carboxylic acid of the solvent system. By this provision the risk for phase separation on the one hand and evaporation of volatile solvents on the other hand is reduced.

Suitable precursor compounds for the use in the method of the present invention are compounds that are soluble in a solvent as outlined above. Although such precursors can be any sufficiently stable salts, organic groups comprising salts are preferred, in particular purely organometallic compounds or organometalloid compounds such as a salt of at least one (optionally substituted) carboxylic acid, such as acetic acid, formic acid, but also dicarboxylic acid, oligocarboxylic acid and/or polycarboxylic acid and/or other common organometallic or organometalloid ligands such as acetylacetonate, tetramethylacetoacetonate, ethylene diamine and others, optionally as hydrate. The salt may also be produced within the solvent mixture in situ, meaning that a suitable salt precursor (namely a metal comprising compound, e.g. an oxide, a carbonate or a pure metal, that reacts with at least one of the components of the solvent to form a solution) is brought into the solvent mixture where it then forms the salt or derivative of the solvent (e. g. a carboxylic acid salt of a carboxylic acid from the solvent).

In the inventive method, the flame has a temperature of at least 1000° C., usually at least 1500° C., preferably at least about 2000° C. A preferred range of the flame temperature for many applications is 1600 to 2600° C.

The average diameter of the droplets can vary depend on the liquid dispersion setup and the properties of the liquid itself. Usually, the average droplet diameter ranges from 0.1·m to 100·m, preferably from 1·m to 20·m.

In one of the preferred embodiments of the present invention, the method is applied in the production of ceria/zirconia. For such mixed oxides presently preferred precursors are cerium acetate hydrate and zirconium acetylacetonate. With these precursors in a solvent consisting of lauric acid and acetic acid in a ratio of 1:1, mixed oxides with excellent properties could be obtained, in particular in the range $Ce_{(0.9-0.1)}Zr_{(0.1-0.9)}O_2$, preferably $Ce_{(0.8-0.2)}Zr_{(0.2-0.8)}O_2$.

The method of the present invention can also be used for the production of other metal oxides, in particular mixed metal oxides. Further oxide systems that may be prepared by the inventive method, using specific carboxylic acids as solvent are e.g:

Ceria based oxides in general and zirconia based oxides in general, but also $LiNbO_3$, $BaTiO_3$, $SrTiO_3$, $CaTiO_3$, $Li_yMnO_x$ and derivatives, NiO, $Li_xTiO_y$, apatite for medical implants, metal doped titania, rare earth metal oxides, especially lanthanum based perovskites, mixed oxides containing an element of the earth metal and from the transition metal group, mixed oxides containing an element from the alkali metals and the transition metals, aluminates, borates, silicates, phosphates, hafnia, thoria, uranium oxide, etc.

The method of the present invention may e.g. also be used to produce stabilized zirconia that can e.g. be used for fuel cells. Such zirconia preferably contains additional metal oxides such as ceria, yttria and/or alkaline earth metals. Most suitable mixed oxides contain less than 20% ceria or yttria, preferably less than 10%, most preferably less than 8% of the additional oxide.

Generally, the method of the present invention is suitable for the production of any metal oxide where metal oxide precursors, in particular organometallic or organometalloid precursors, in particular purely organometallic or purely organometalloid metal salts have to be dissolved at sufficient concentration in a high enthalpy solvent for high temperature FSP. The as-prepared oxides may be subjected directly to an after-treatment in order to form nitrides, carbides, suicides, borides and others.

By the inventive method, it became possible for the first time to provide metal oxides, in particular mixed metal oxides, that have at least one of the following properties pure and mixed metal oxides:
good particle homogeneity as prepared, i.e. no large or hollow particles intermixed with smaller particles (e. g. only one type of particles is formed)
almost no aggregates as prepared
very good particle size stability after heating (e.g. 700° C., 16 hours in air, or 900° C., 2 h, air)
high thermal stability, e. g. no phase change upon heating the material
mixed metal oxides:
very good homogeneity on atomic level
good phase stability
well defined crystal size distribution ceria or ceria/zirconia:
very high oxygen storage capacity as prepared
very high oxygen storage capacity after heat treatment (e.g. 700° C., 16 h in air)
very high phase stability, even after heat treatment (e. g. 900° C., 2 hours in air)
uniform morphology The metal oxides of the present invention, in particular the mixed metal oxides, have the applications already known for them and an extended field of applications due to their improved properties. For ceria/zirconia e.g. one of the preferred fields of application is as a catalyst for combustion engine exhaust gases, e.g. in the automotive industry. For applications in vehicles usually a ceria/zirconia comprising catalyst having a monolithic structure is used. Such monolithic structure can e.g. be obtained by mixing ceria or preferably ceria/zirconia then forming said mixture into the desired structure, or by first forming the desired, preferably monolithic structure from alumina or other oxides, and then applying a layer of ceria or ceria/zirconia. The products of the first and second method differ in that by the first method a homogeneous mixture is obtained wherein some of the catalyst is not well used due to reduced availability to the exhaust gases, while in the second method further process steps are needed during production due to the subsequent application of a layer to an already formed carrier structure. Furthermore, in the case of abrasion, the life-time of the differently prepared catalysts may vary.

The ceria/zirconia catalysts of the present invention can be used together with further catalytically active substances such as further metal oxides, e.g. titania, vanadia, chromia, manganese, iron, cobalt, nickel, copper oxides and/or noble metals, e.g. platinum, palladium, rhodium, ruthenium, rhenium, iridium, all of them alone or in admixture with one or more thereof, or alloys thereof. However, due to the improved properties of the catalysts of the present invention, the addition of further catalytically active substances may be unnecessary.

Besides of their possible use as catalysts, the metal oxides of the present invention, such as e.g. ceria, zirconia or ceria/zirconia, due to their great homogeneity can be used for mechanochemical polishing.

Stabilized zirconia made by the present invention may be used in fuel cells, where the high phase homogeneity and the mixing at atomic level favour oxygen ion transport as it has been shown by the OSC measurements. Furthermore, the excellent degree of mixing obtained by the method of the present invention allows for high thermal and mechanical stability, as crystallites stay very small (see FIG. 5B), thus reducing the chance of crack formation. This properties make the ceria-stabilized zirconia of the present invention highly suitable for high-temperature and low-temperature fuel cell application. Given the homogeneous particle structure, the oxides of the present invention are furthermore suitable for the manufacture of coatings, in structural ceramics or for protecting layers on metals.

Applications for other metal oxides are e.g. as heterogenous catalysts, as structural ceramics, as battery storage materials, for chemical sensors, for elements in energy production, for solar energy production elements, for electron storage in recyclable battery units, as dielectrics, as gas permeable membranes, as pigments, polymer additives, stabilizers, magnetic fluids, polishing powders, additives in metal alloys, in armor fabrication, in microelectronics, as electrode raw material, as phosphors for radiation sensitive elements and in displays, cosmetics, pharmaceutical packaging, additive in food and pharmaceutical applications, fuel cells, superconductors and others.

EXAMPLES

1. Ceria, Zirconia and Ceria/zirconia
General Procedure

Ceria/zirconia mixed oxide powders were produced by flame spray pyrolysis in a laboratory scale setup. Cerium (III) acetate hydrate (Aldrich, >99.7%) and zirconium tetra acetylacetonate (Aldrich, 99%) were mixed according to the product composition and dissolved in a lauric acid/acetic acid mixture (1:1 by weight, heated to full dissolution). The total final metal concentration in the precursor mixture was kept constant at 0.15 mol/l throughout all experiments. The as-prepared solutions were stable and could be delivered into the flame of an FSP apparatus [Mädler et al. (2002A), FIG. 1] by a syringe pump (Inotech IR-232) at 5 ml/min. The flame consists of a central spray delivery, a premixed, circular support flame (diameter 6 mm, slit width 150·m) and a circular sheet gas delivery (ring of sinter metal, inner diameter 11 mm, outer diameter 18 mm, 5 l oxigen/min.). Oxygen (Pan Gas, 99.8%) was used as a dispersion gas in all experiments and delivered at 5 l/min. A mixture of methane (1.5 l/min, Pan Gas, 99%) and oxygen (3.2 l/min) was fed to the inner slit and formed a premixed flame. All gas flow rates were controlled by calibrated mass flow controller (Bronkhorst EL-Flow F201). Powders were denoted as (a/b) $Ce_xZr_{1-x}O_2$, where a is the liquid flow rate in l/min, b the dispersion gas flow rate in l/min and x the amount of ceria in the samples in atom-%.

Preparation of Solvents.

500 g of acetic acid (99.95%) and 500 g lauric acid were mixed and heated to 50° C. to full dissolution. This high enthalpy mixture is stable for days, small amounts of precipitated lauric acid that may be present after prolonged storage may be removed by gentle warming.

Preparation of Precursor-Mix

Corresponding amounts of cerium acetate hydrate and zirconium acetylacetonate were dissolved in the above mixture to a total metal concentration of 0.15 mole/l. These precursor solutions were stable at ambient conditions and could readily be sprayed. Their high enthalpy content combined with the capability to dissolve readily available, polar metal ions, makes these mixtures suitable for the preparation of mixed oxides.

Results and Discussion

FIG. 1A depicts a TEM (transmission electron microscope) picture of as-prepared ceria/zirconia $Ce_{0.7}Zr_{0.3}O_2$. The product consists of well-crystalline, sharp edged nanoparticles of 4–10 nm diameter. No large lumps of ceria could be detected. This corroborates sufficient enthalpy delivery and good dispersion of the metal precursor in the flame.

If the powders obtained according to the present invention are heated for 2 h at 900° C., a clear difference in specific surface area is visible (see FIG. 1B). While the preparation disclosed by Madler et al. (2002B) results in a product with 28 m$^2$/g, the acid based method yields 39 m$^2$/g. Thermal treatment stability is associated with uniform morphology. This result clearly shows the superior performance of the ceria produced by the method of the invention (Table 1).

Figure 2B:
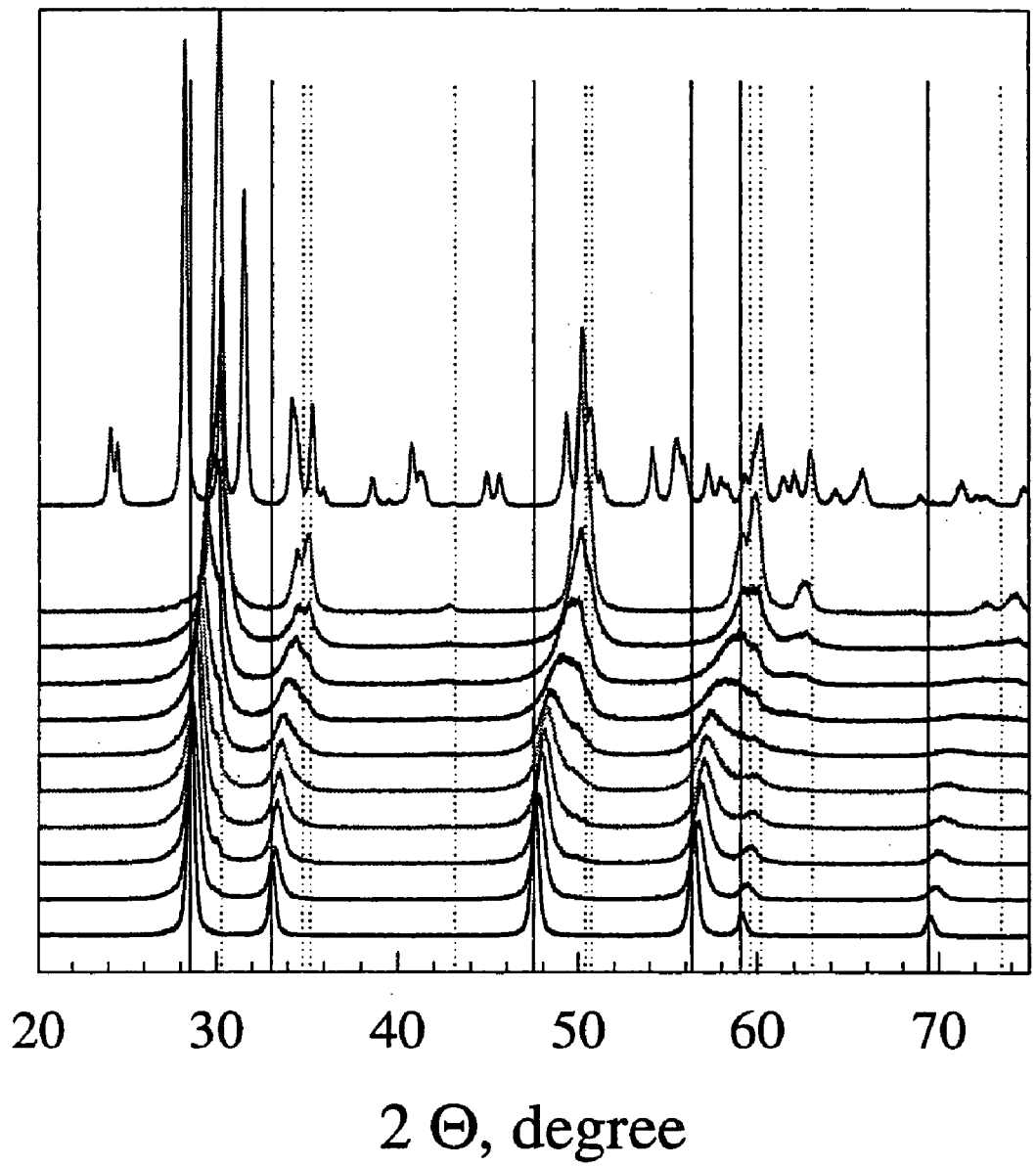

FIG. 2A shows the XRD of ceria/zirconia $Ce_xZr_{(1-x)}O_2$ starting from pure ceria (x=1, bottom) to pure zirconia (x=0). The broad signals from the stable mixed ceria/zirconia phase slowly shift to higher diffraction angle (two theta). This smooth shift from pure ceria to pure zirconia corroborates the extreme mixing of the as-prepared ceria/zirconia. The continuous transition may best be observed for the peak around 50°. FIG. 2B gives the XRD signals for the same samples, heated to 900° C. for two hours in air. Due to thermal treatment, the peaks get narrower. The solid solution is stable, however, even after this high temperature treatment. Again, the peaks shift from pure ceria to zirconia. Now, the latter has transferred into the monoclinic phase and shows a different diagram. Adding as few as 10 atom-% ceria fully prohibits this transition and an extremely stable mixed oxide is obtained.

Figure 3:
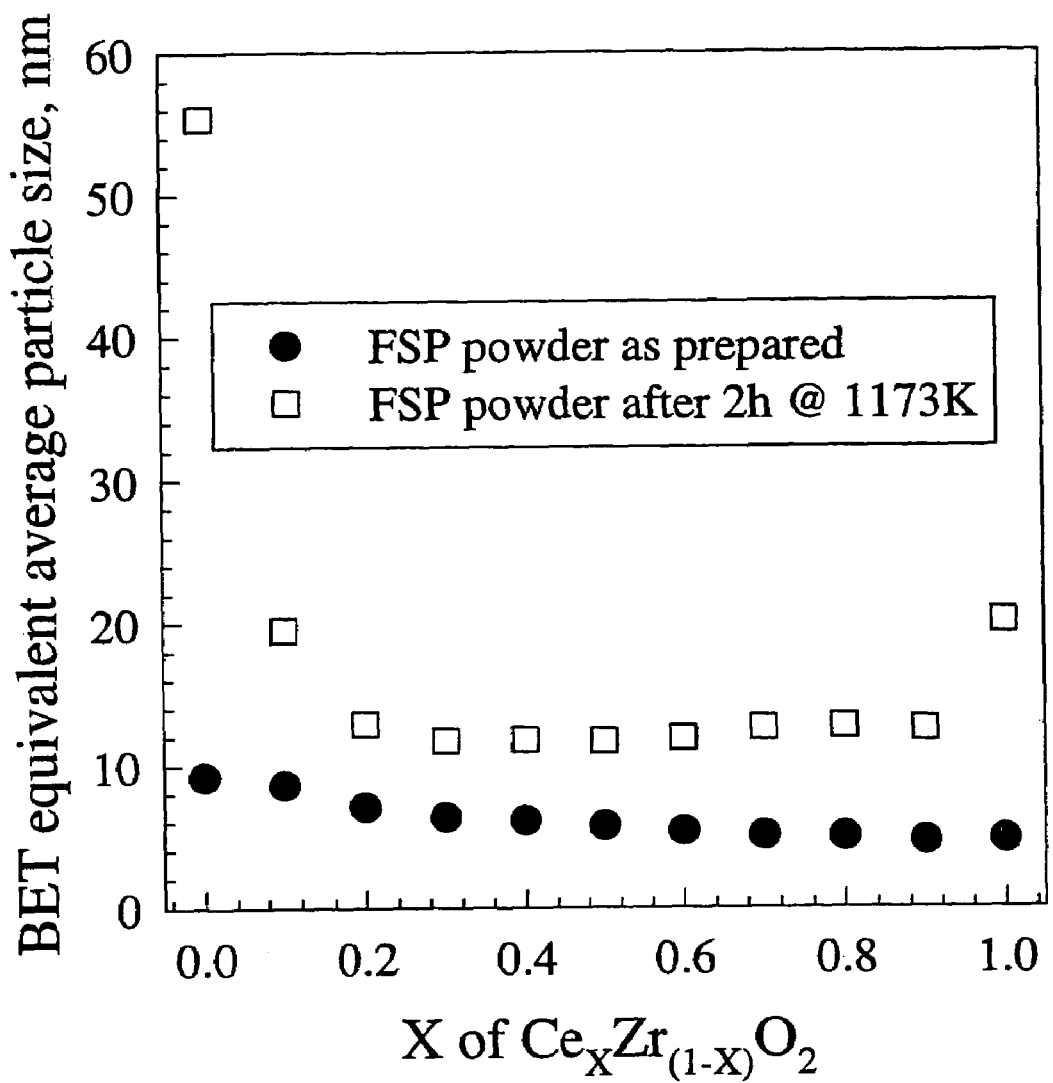
FIG. 3 shows the specific surface area of $Ce_xZr_{(1-x)}O_2$ of the present invention (squares) and calcined powders (2 h at 900° C. in air, circles). Note the sharp drop in specific surface area for x=0.1 to pure zirconia, showing the large degree of stabilisation.

FIG. 3 gives the specific surface area of as-prepared $Ce_xZr_{(1-x)}O_2$ (squares) and calcined powders (circles). While the specific surface area of zirconia containing powders is generally constant, a drop is found for pure ceria. The mere addition of 10 atom-% zirconium to ceria already leads to considerable stabilisation. Further increasing the zirconia content has only a minor effect on the specific surface area. Interestingly, after thermal treatment at 900° C. for 2 h in air, all powders have similar specific surface area, further compared in FIG. 5A.

Figure 4:
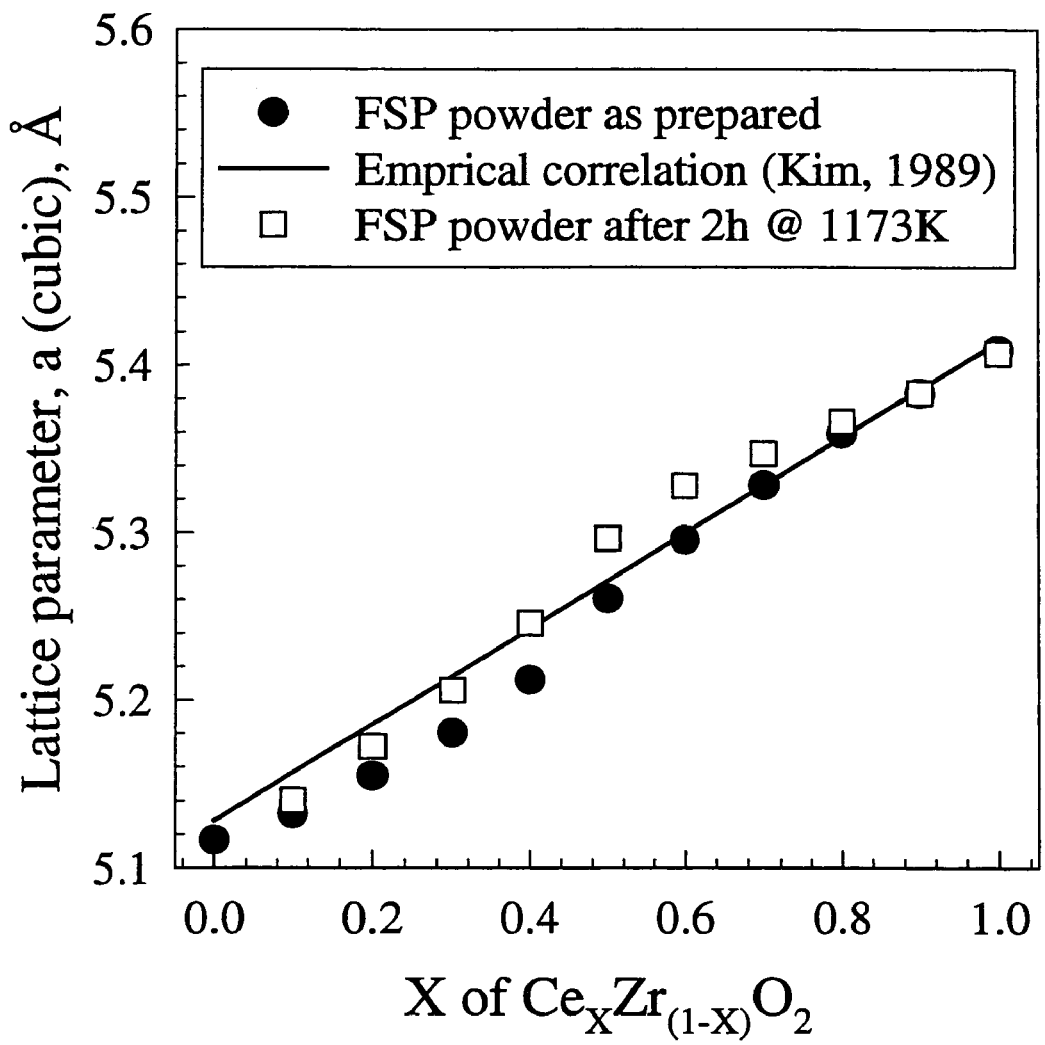
FIG. 4 is a plot of the lattice parameter a, assuming a cubic system, for $Ce_xZr_{(1-x)}O_2$ as a function of increasing ceria content, wherein the line represents an empirical correlation found by Kim (1989), valid for doped ceria over a broad range of compositions.

FIG. 4 plots the lattice parameter a, assuming a cubic system, for $Ce_xZr_{(1-x)}O_2$ as a function of increasing ceria content. The smaller zirconia kation $Zr^{4+}$ substitutes $Ce^{4+}$ ions in the ceria lattice and squeezes the crystal, leading to a smaller unit cell with reduced a. The line in FIG. 4 represents an empirical correlation found by Kim (1989), valid for doped ceria over a broad range of compositions. The as-prepared powders follow the correlation with minor deviations. Thermal treatment of the product did not affect the mixed oxide phases and the formation of separate phases could not be detected by XRD in any sample. Pure zirconia after thermal treatment at 900° C. is not included, since it changed part of its phase. The correlation of these samples with the Vegard rule corroborates the molecular mixing of the precursors, responsible for the overall performance of the $Ce_xZr_{(1-x)}O_2$.

Figure 5:
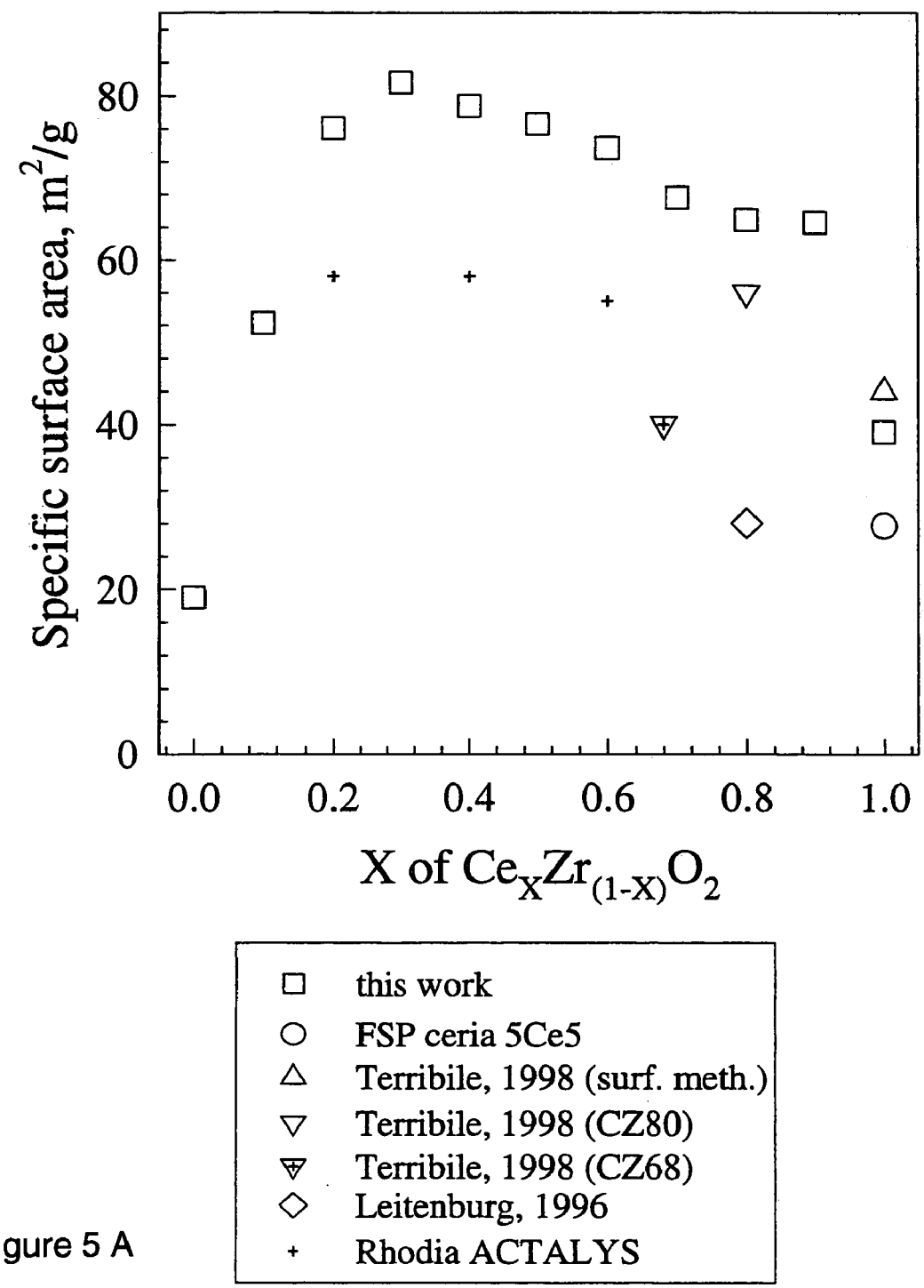
FIG. 5A is a comparison of the specific surface area of flame-spray made ceria, ceria/zirconia, wet-phase made mixed oxides, and a commercial sample.
FIG. 5B gives the average crystal size as determined by XRD for all samples from pure ceria to pure zirconia. Both addition of 10% ceria to zirconia or 10% zirconia to ceria leads to a pronounced decrease in average crystal size, therefore showing a high degree of stabilisation.

FIG. 5A compares the specific surface area of flame-spray made ceria, ceria/zirconia and wet-phase made mixed oxides and commercial Rhodia ceria/zirconia. Trovarelli et al. (1997) prepared ceria by high energy ball mixing but obtain poor mixing at an atomic level. Terribile et al. (1998) prepared ceria by a hybrid organic/inorganic route and found excellent specific surface areas. Calcination, however, reduced the surface area to about 43 m$^2$/g. Mixed oxide samples prepared by Terribile et al. (1998) exhibited 56 and 40 m$^2$/g for x=0.8 and 0.68, respectively, after calcination at 900° C. Leitenburg et al. (1996) used precipitation to prepare ceria/zirconia and achieved up to 30 m$^2$/g for x=0.2. FIG. 5A further compares materials of this invention to commercially available ceria/zirconia supplied by Rhodia. The commercial catalyst stays around 50 m$^2$/g while the material of this invention exceeds well beyond that.

Figure 5B:
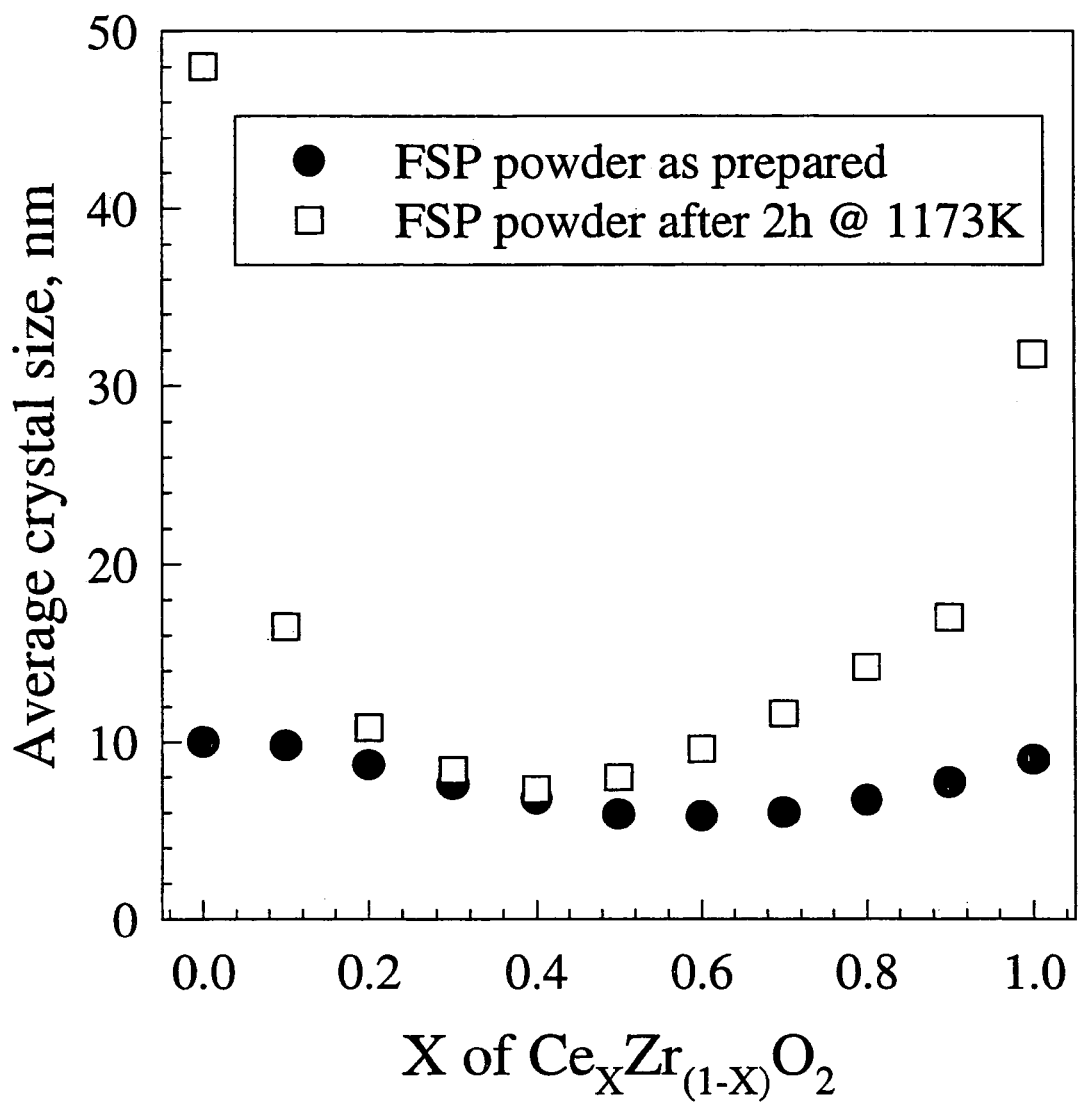

FIG. 5B shows the minimum crystal size for intermediate composition that proofs the extreme degree of mixing.

Figure 6:
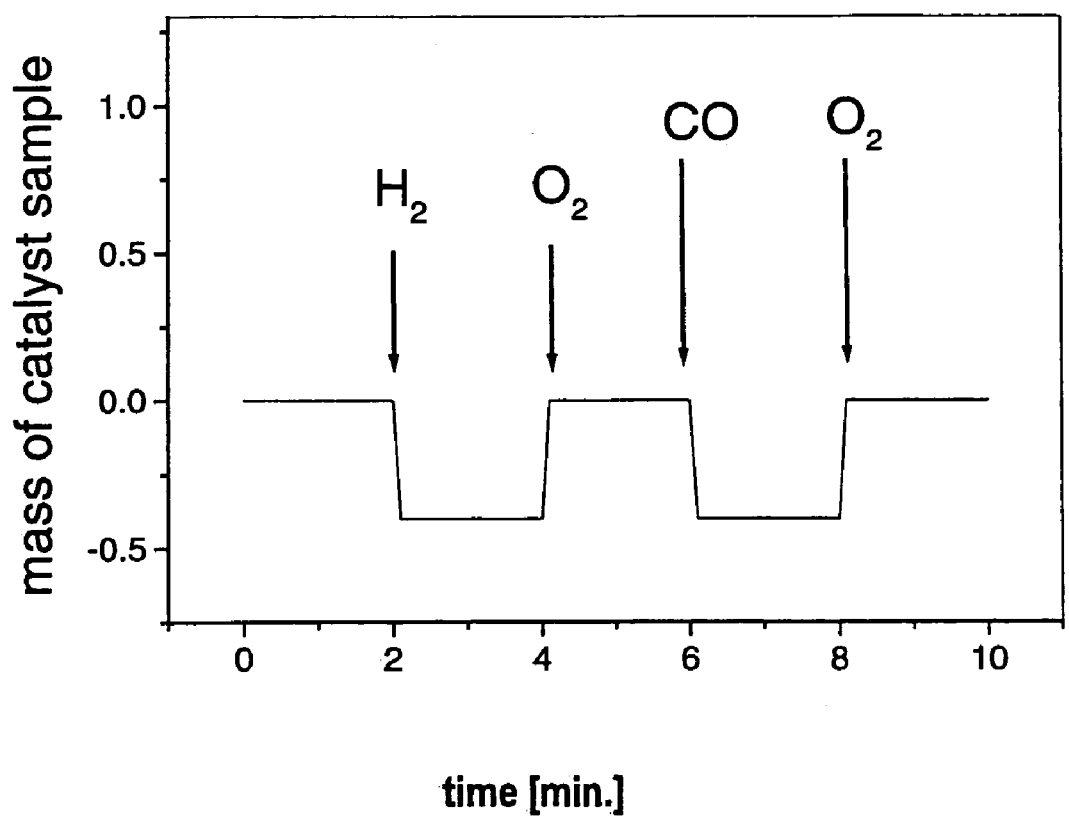
FIG. 6 gives the principle of oxygen storage capacity measurements (OSC).

FIG. 6 gives the principle of oxygen storage capacity (OSC) measurments as described by Rocchini et al. (2000) and Trovarelli et al. (1997). The sample (50 mg) is placed in a thermographimetric balance and subjected to pulses (2 ml) of hydrogen and oxygen. The loss of mass is due to removed oxygen. The material is fully reoxidized by the second puls, corroborating the dynamic oxygen storage capacity. OSC is measured for both hydrogen and CO, both leading to the same degree of reduction.

Figure 7:
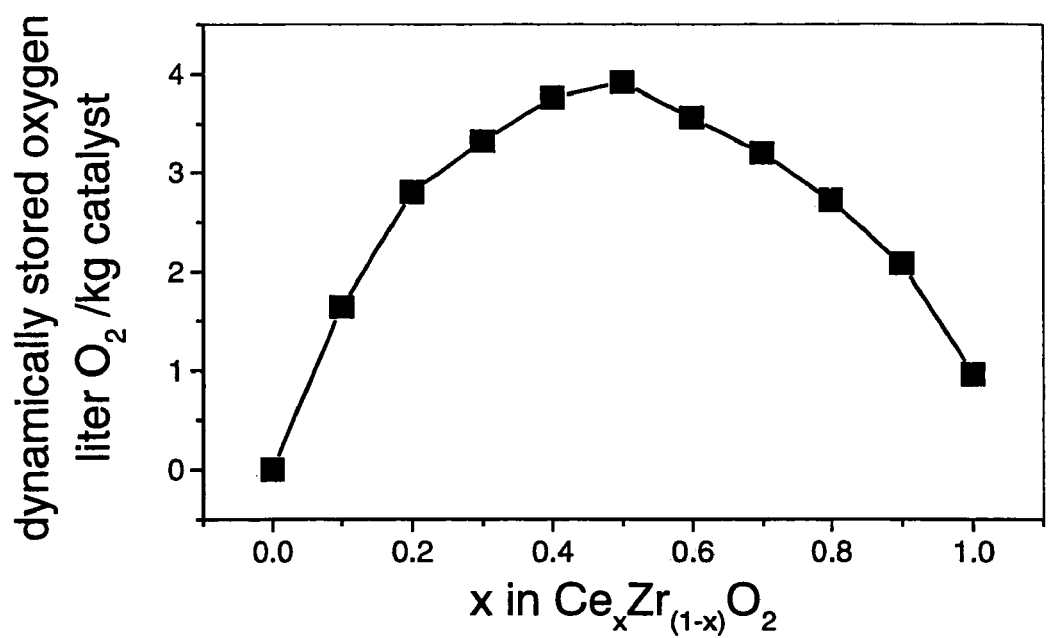
FIG. 7A compares OSC for reduction of the catalyst by $H_2$ and CO from pure zirconia to pure ceria.
FIG. 7B gives the relative (pure ceria=1) oxygen storage capacity per ceria for all samples of FIG. 7A.
Figure 7:
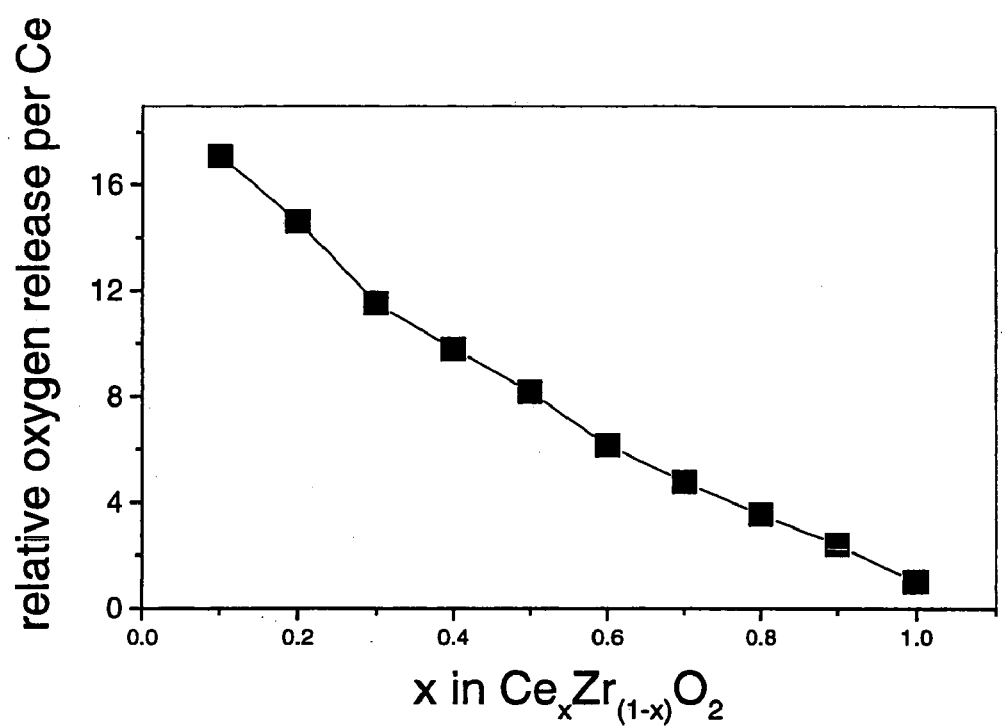

FIG. 7A compares oxygen storage capacity (OSC) for reduction of the catalyst by $H_2$, CO from pure zirconia to pure ceria. At intermediate composition, very high oxygen storage capacity is found. The smooth transition from zirconium to cerium further agrees with the data from XRD. Here, the same smooth transition corroborates the extreme degree of mixing of the two components. All measurements are done at 700° C. Samples are heated to 700° C. for 16 h prior to measurement. Commercial Catalyst (Rhodia) does not show a smooth transition if going from ceria to zirconia. The OSC rather shows a maximum at 20% zirconia (x=0.8) and stays almost constant to 40% zirconia, but then drops rapidly. Trovarelli et al. (1997) report maximum dynamic OSC at x around 0.8. The flame made samples in this work show a maximum OSC related to mass at intermediate zirconia content (x around 0.5), therefore they require less of ceria for the same dynamic OSC per mass.

FIG. 7B gives the relative (pure ceria=1) oxygen storage capacity per ceria for all samples. A tremendous increase in oxygen storage capacity per cerium in the sample is evident. This may be used to reduce the content of expensive ceria in the catalyst, or, to reduce the size of the overall catalyst since high activity is found. Again, the data follow a smooth correlation, in agreement with the prior data from XRD, TEM and BET specific surface area measurement. Boaro et al. (2000) also report on the relative OSC of different ceria/zirconia samples. They found a four-fold increase in OSC for x=0.2 relative to pure ceria. In samples from this work, the corresponding increase is fourteen-fold.

Conclusions

Ceria/zirconia mixed oxides of high specific surface area and good thermal stability can be prepared by flame spray pyrolysis. The major process parameters, precursor solution composition, enthalpy delivery and metal concentration in the flame, allow to control the production process over a broad range of conditions. In the scope of the present invention it could be shown that molecular mixing, e.g. in the synthesis of ceria/zirconia, is of great importance. Such molecular mixing is dependent on the phase stability. Due to insufficient mixing or partial precipitation in the precursor mix, significant affection of properties of the mixed metal oxides prepared from such inhomogeneous precursor mixes has been found.

Adding as low as 10 atom-% zirconia to ceria leads to increasing temperature stability. The product ceria/zirconia may be characterized as an intimately mixed solid solution and forms a stable phase up to high zirconia contents. Compared to conventionally prepared ceria/zirconia, mixed oxides with increased thermal stability of flame-made mixed oxides could be provided. This may be associated with the high preparation temperature favoring a pre-equilibrated structure and uniform morphology, both enhancing the thermal stability. Increased molecular mixing in ceria/zirconia results in much higher ceria usage, both facilitating the catalytic process and lowering production costs, since cheaper zirconium precursors can be used in larger quantities, e.g. up to $Ce_{0.2}Zr_{0.8}O_2$, that has been found to still have e.g. as good OSC as $Ce_{0.8}Zr_{0.2}O_2$.

2. Superior Thermal Stability of Flame Spray Made Pt/Ceria/Zirconia if Prepared from Carboxylic Acid Mixtures.

Preparation

Adding platinum acetylacetonate to the as described cerium- and zirconium containing liquid and flame spraying it results in Pt/ceria/zirconia nanoparticles with excellent Pt dispersion. In a specific example, 2 wt% platinum on ceria/zirconia (Ce0.5Zr0.5O2) was prepared with a specific surface area after preparation of 105 m2/g. Sintering for 16 h, air, at 700° C. with a ramp of 5° C./min only reduced the surface area to 97 $m^2/g$. This corroborates excellent stability. This sintered sample was tested for the dynamic oxygen exchange capacity as described for the ceria/zirconia samples. It was compared against a reference prepared according to the previous section (Leitenburg et al., 1996)) but with an additional impregnation step for Pt deposition. Thereby, 2 wt % platinum were deposited by incipient wetness impregnation using the method of Silvestro-Albero (2002). This samples was subjected to the same pretreatment (16 h, 700° C., air).

Oxygen Exchange Capacity

Figure 9:
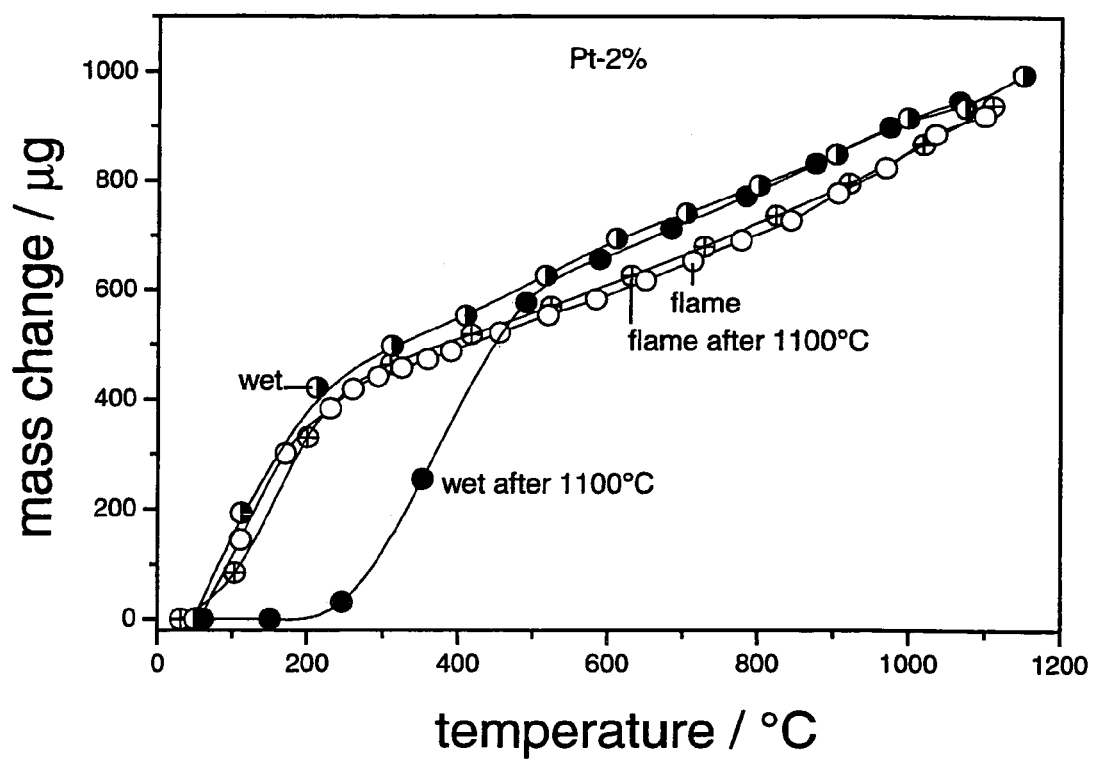
FIG. 9 shows the reversibly occurring mass uptake and loss of oxygen of Pt/ceria/zirconia prepared by wet method or FSP, measured at a heating rate of 3° C./min, with both samples taken up to 1100° C. and subjected to repeated pulses of CO or $H_2$ with following pulses of $O_2$ for reoxidation.

At a heating rate of 3° C./min, the two samples were taken up to 1100° C. and subjected to repeated pulses of CO or $H_2$ with following pulses of $O_2$ for reoxidation. The corresponding reversibly occurring mass uptake and loss of oxygen is shown in FIG. 9. Samples were then cooled down and the same heating ramp was repeated again to check for stability. The precipitated sample changes dramatically and the beneficial effect from Pt addition is heavily reduced. The flame made Pt/ceria/zirconia, however, retains most of its activity. Or, in other words, even this severe treatment of heating up to 1100° C. under changing atmosphere did not kill the beneficial effects from the Pt addition.

Figure 8:
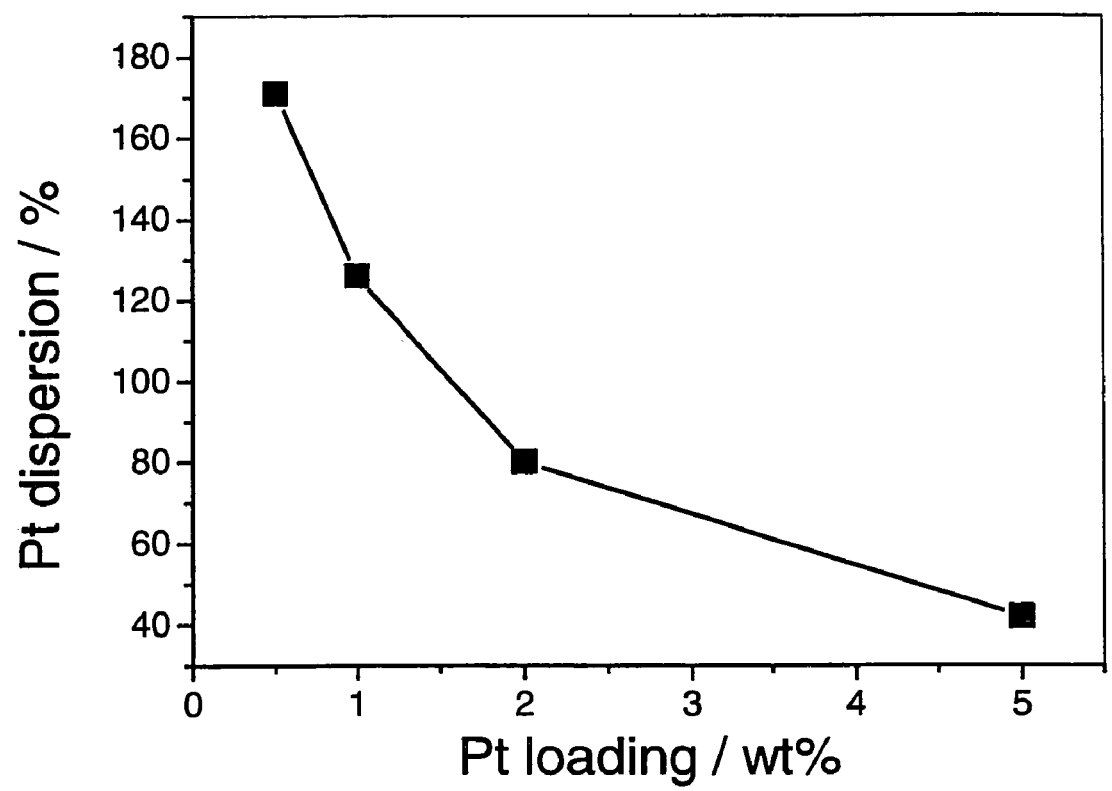
FIG. 8 gives the Pt dispersion as determined by CO-pulse chemisorption of Pt on flame made ceria/zirconia.

The stability and favored dispersion of Pt on flame made ceria/zirconia is further illustrated by measuring Pt dispersion on the surface of such catalysts. FIG. 8 gives the Pt dispersion as determined by CO-pulse chemisorption (Micromeritics AutoChem II). The high dispersion of Pt on such samples supports their unique properties.

While there are shown and described presently preferred embodiments of the invention, it is to be distinctly understood that the invention is not limited thereto but may be otherwise variously embodied and practised within the scope of the following claims.

REFERENCES

Laine, R. M., Hinklin, T., Williams, G., Rand, S. C.; Low Cost Nanopowders for Phosphor and Laser Applications by Flame Spray Pyrolysis, *J. Metastable Nanocryst. Mat.*, 2000, 8, 500.

Aruna, S. T., Patil, K. C.; Combustion Synthesis and Properties of Nanostructured Ceria-Zirconia Solid Solutions, *NanoStructured Materials*, 1998, 10, 955.

Laine, R. M., Baranwal, R., Hinklin, T., Treadwell, D., Sutorik, A., Bickmore, C., Waldner, K., Neo, S. S.; Making nanosized oxide powders from precursors by flame spray pyrolysis., *Key. Eng. Mat.*, 1999, 159, 17.

Trovarelli, A., Zamar, F., Llorca, F., Leitenburg, C., Dolcetti, G., Kiss, J. T.; Nanophase Fluorite-Structured CeO2-ZrO2 Catalysts Prepared by High-Energy Mechanical Milling, *J. Catal.*, 1997, 169, 490.

Terribile, D., Trovarelli, A., Llorca, J., Leitenburg, C., Dolcetti, G.; The Synthesis an Characterization of Mesoporous High-Surface Area Ceria Prepared Using a Hybrid Organic/Inorganic Route, *J. Catal.*, 1998, 178, 299.

Rocchini, E., Trovarelli, A., Llorca, J., Graham, G. H., Weber, W. H., Maciejewski, M., Baiker, A.; Relationship between Structural/Morphological Modifications and Oxygen Storage-Redox Behavior of Silica-Doped Ceria, *J. Catal.*, 2000, 194, 461.

Catalysis, R. E.; www.rhodia-ec.com/site_ec_us/catalysis/page_automotive.htm, 2002

Leitenburg, C., Trovarelli, A., Llorca, J., Cavani, F., Bini, C.; The effect of doping CeO2 with zirconium in the oxidation of isobutane, *Appl. Catal. A*, 1996, 139, 161.

Terribile, D., Trovarelli, A., Llorca, J., Leitenburg, C., Dolcetti, G.; The preparation of high surface area CeO2-ZrO2 mixed oxides by a surfactant-assisted approach, *Catal. Today*, 1998, 43, 79.

Boaro, M.; de Leitenburg, C.; Dolcetti, G.; Trovarelli, A.; The dynamics of oxygen storage in ceria zirconia model catalysts measured by CO oxidation under stationary and cycling feedstream compositions, *Journal of Catalysis*, 2000, 193, 338–347.

Yoshioka, T., Dosaka, K., Sato, T., Okuwaki, A., Tanno, S., Miura, T.; Preparation of spherical ceria-doped tetragonal zirconia by the spray pyrolysis method, *J. Mater. Sci. Lett.*, 1992, 11, 51.

Kim, D.-J.; Lattice Parameters, Ionic Conductivities and Solubility Limits in Fluorite-Structure MO2 Oxide (M=Hf 4+, Ce 4+, Th 4+, U 4+) Solid Solutions, *J. Am. Ceram. Soc.*, 1989, 72, 1415.

Mädler, L., Kammler, H. K., Mueller, R., S. E. Pratsinis; Controlled synthesis of nanostructured particles by flame spray pyrolysis, *Aerosol Science*, 2002A, 33, 369.

Mädler, L., Stark, W. J., Pratsins, S. E., Flame-made Ceria Nanoparticles, *J. Mater. Res.*, 2002B, 17, 1356.

Taylor, K. C. in J. R. Anderson, M. Boudart (Eds.) "Catalysis—Science and Technology", Chapter 2, Springer, Berlin (1984).

Balducci, G., Fornasiero, P., Di Monte, R., Kaspar, J., Meriani, S., Graziani, M., Catal. Lett., 1995, 33, 193.

Kundakovic, L., Flytzani-Stephanopoulos, M., Reduction characteristics of copper oxdie in cerium and zirconium oxide systems, Appl. Catal. A-Gen., 1998, 1, 13

Trovarelli, A.; Catalytic Properties of Ceria and CeO2-Containing Materials, *Catal. Rev. -Sci. Eng.*, 1996, 38(4), 439.

Kaspar, J., Fornasiero, P., Graziani, M.; Use of CeO2-based oxides in the three way catalysis, *Catal. Today*, 1999, 50, 285.

J. Silvestro-Albero, *J. Catal.*, 2002, 210, 127–136.

The invention claimed is:

1. A method for the production of a metal oxide, wherein at least one metal oxide precursor is dissolved in a high enthalpy carboxylic acid solvent comprising at least one carboxylic acid with a mean carbon content at least 2.2 carbon atoms in an amount of at least 60% of the whole solvent to form a solution, and wherein said solution is then formed into droplets and flame oxidized.

2. The method of claim 1, wherein the carboxylic acid content is at least 75% of the whole solvent.

3. The method of claim 1, wherein the at least one carboxylic acid has a mean carbon content per acid group of at least 3.

4. The method of claim 1, wherein the carboxylic acid is selected from C1 to C18 monocarboxylic acids and mixtures thereof.

5. The method of claim 4, wherein the carboxylic acid is a mixture of formic acid and/or acetic acid and at least one further acid with at least 3 carbon atoms.

6. The method of claim 1, wherein at least one of the carboxylic acids comprises one or more —OH and/or —NH$_2$ and/or —CONH$_2$ groups.

7. The method of anyone of claim 1, wherein the solvent has an enthalpy of at least 15 kJ/g.

8. The method of claim 1, wherein the metal oxide precursor is a salt or a salt precursor.

9. The method of claim 8, wherein the salt or salt precursor comprises a hydrate.

10. The method of anyone of claim 1, wherein the flame has a temperature of at least 1000° C.

11. The method of claim 10, wherein the temperature is within the range of 1600 to 2600° C.

12. The method of anyone of claim 1, wherein the droplets have an average diameter of 0.1 to 100 microns.

13. The method of anyone of claim 1, wherein the metal is selected from the alkali metal group and/or the alkaline earth metal group and/or the transition metal group.

14. The method of claim 1, wherein the at least one carboxylic acid has a mean carbon content per acid group within the range of 4 to 8.

15. The method of claim 1, wherein at least one of the carboxylic acids comprises double bonds and/or substituents.

16. The method of claim 1, wherein the solvent has an enthalpy of at least 20 kJ/g.

17. The method of claim 1, wherein the solvent has an enthalpy of at least 23 kJ/g.

18. The method of claim 1, wherein the metal oxide precursor is an organic group comprising salt.

19. The method of claim 18, wherein the salt is purely organic.

20. The method of claim 1, wherein the metal oxide precursor is a salt of at least one carboxylic acid and/or acetylacetonate.

21. The method of claim 1, wherein the droplets have an average diameter within the range of 1 of 20 microns.

22. A metal oxide that is obtainable by a method of claim 1.

23. A metal oxide according to claim 22, that has a surface after heat treatment at 900° C. for 2 hours in air of at least 39 m$^2$/g.

24. A metal oxide according to claim 22, that is ceria/zirconia.

25. The metal oxide of claim 24, with the zirconium being present in at most 90 atom-% of total metal atoms.

26. The metal oxide of claim 25 wherein the zirconium is present in at most 80 atom-% of total metal atoms.

27. A metal oxide claim 24, that is phase stable upon heating at 900° C. for 2 hours in air.

28. A metal oxide according to claim 24, wherein the two or more metals are homogeneously mixed at atomic level.

29. A metal oxide according to claim 22, that has a dynamic oxygen storage capacity after heat treatment at 700° C. for 16 hours in air of at least 1.5 liters O$_2$ per kg catalyst.

30. A metal oxide according to claim 22, to that is zirconium stabilized with cerium and/or yttrium, in an amount of cerium and/or yttrium of at most 10 atom-% of whole metal content.

31. A metal oxide according to claim 22, that has a surface after heat treatment at 900° C. for two hours in air of above 50 mg$^2$/g.

32. A metal oxide according to claim 22 that is a mixed metal oxide.

33. A metal oxide according to claim 22, that is zirconium stabilized with cerium and/or yttrium.

* * * * *